United States Patent
Sodagar

(10) Patent No.: US 12,388,886 B2
(45) Date of Patent: Aug. 12, 2025

(54) SESSION-BASED DESCRIPTION URL CUSTOMIZATION USING THE SESSION-BASED DASH OPERATIONS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/545,781

(22) Filed: Dec. 19, 2023

(65) Prior Publication Data

US 2024/0121286 A1 Apr. 11, 2024

Related U.S. Application Data

(63) Continuation of application No. 17/702,874, filed on Mar. 24, 2022, now Pat. No. 11,895,172.

(60) Provisional application No. 63/177,788, filed on Apr. 21, 2021.

(51) Int. Cl.
*H04L 65/65* (2022.01)
*H04L 65/70* (2022.01)

(52) U.S. Cl.
CPC .............. *H04L 65/65* (2022.05); *H04L 65/70* (2022.05)

(58) Field of Classification Search
CPC ................................ H04L 65/65; H04L 65/70
See application file for complete search history.

(56) References Cited

U.S. PATENT DOCUMENTS

| 9,338,209 | B1* | 5/2016 | Begen | H04N 21/84 |
| 9,882,937 | B2* | 1/2018 | Bouazizi | H04L 65/612 |
| 11,895,172 | B2* | 2/2024 | Sodagar | H04N 21/2393 |
| 2003/0079052 | A1* | 4/2003 | Kushnirskiy | G06F 9/44526 |
| | | | | 712/E9.082 |
| 2014/0013375 | A1* | 1/2014 | Giladi | H04L 65/75 |
| | | | | 725/112 |
| 2015/0172066 | A1* | 6/2015 | Gholmieh | H04N 21/6131 |
| | | | | 370/312 |
| 2015/0270979 | A1* | 9/2015 | Andrada | H04L 12/189 |
| | | | | 370/390 |
| 2016/0261665 | A1* | 9/2016 | Stockhammer | H04L 65/65 |
| 2016/0366488 | A1* | 12/2016 | Long | H04N 21/23439 |
| 2017/0310722 | A1* | 10/2017 | Chen | H04L 65/612 |
| 2017/0366593 | A1 | 12/2017 | Lau | |

(Continued)

*Primary Examiner* — Dhairya A Patel
(74) *Attorney, Agent, or Firm* — Sughrue Mion, PLLC

(57) ABSTRACT

A method and apparatus for providing video content in a Dynamic Adaptive Streaming over Hypertext Transfer Protocol (DASH) streaming session may be provided. The method may include obtaining a pre-session-based description (PreSBD) information of the DASH streaming session instructing a PreSBD client to generate customized session-based description (SBD) document uniform resource locator (URL) for a plurality of SBD descriptors of the DASH streaming session. The method may further include instantiating the PreSBD client and passing PreSBD descriptor information. Then, the method may include controlling generation of a customized SBD document URL associated with a first SBD descriptor from the plurality of SBD descriptors of the DASH streaming session. The method may further include launching a first SBD client based on the customized SBD document URL and passing the first SBD descriptor.

20 Claims, 8 Drawing Sheets

(56) References Cited

U.S. PATENT DOCUMENTS

| | | | |
|---|---|---|---|
| 2018/0184136 A1* | 6/2018 | Oh | H04N 21/23 |
| 2018/0270160 A1* | 9/2018 | Muñoz De La Torre Alonso | H04L 41/0893 |
| 2019/0222881 A1* | 7/2019 | Hirabayashi | H04N 21/2662 |
| 2020/0304949 A1* | 9/2020 | Mate | G06T 19/006 |
| 2021/0076093 A1 | 3/2021 | Rengaraju et al. | |
| 2021/0099508 A1 | 4/2021 | Sodagar | |
| 2021/0281621 A1* | 9/2021 | Sodagar | H04L 67/02 |
| 2021/0385522 A1* | 12/2021 | Giladi | H04N 21/2362 |
| 2022/0303331 A1* | 9/2022 | Svennebring | H04N 21/44209 |

* cited by examiner

SESSION-BASED DESCRIPTION URL CUSTOMIZATION USING THE SESSION-BASED DASH OPERATIONS

CROSS REFERENCE TO RELATED APPLICATION

This application is a Continuation Application of U.S. application Ser. No. 17/702,874 filed Mar. 24, 2022, which is based on and claims priority to U.S. Provisional Patent Application No. 63/177,788, filed on Apr. 21, 2021, the disclosure of which is incorporated by reference herein in its entirety.

BACKGROUND

The Moving Picture Experts Group (MPEG) has recently shown increased interest in Dynamic Adaptive Streaming over HTTP (DASH) standardization for Session-Based DASH Operation. During a session to discuss DASH standardization, while the media presentation description (MPD) is generic for all clients, a client may get a side file, known as the session-based description (SBD), which provides instructions for the client to make MPD specific for that session.

Session-based DASH operation is an important approach to customize the MPD per session and possibly per client. Current design allows one or more SBD documents to be applied to uniform resource locator (URL) parts or queries of various requests. However, current design fails to allow SBD documents to be applied to queries that request SBD documents. That is, current design does not allow customization of the SBD document URL that may be used in an SBD descriptor. There is a need for being able to customize SBD document URLs in a same manifest.

SUMMARY

According to embodiments of the present disclosure, a method for providing video content may include obtaining a pre-session-based description (PreSBD) information of a session instructing a PreSBD client to generate customized session-based description (SBD) document uniform resource locator (URL) for a plurality of SBD descriptors of the session; instantiating the PreSBD client and passing PreSBD descriptor information; controlling generation of a customized SBD document URL associated with a first SBD descriptor from the plurality of SBD descriptors of the session; and launching a first SBD client based on the customized SBD document URL and passing the first SBD descriptor.

The method, according to embodiments, may further include controlling generation of a segment uniform resource locator (URL) based on the first SBD descriptor and the customized SBD document URL, and processing a request for a segment of the video content by at least modifying the segment URL; and providing the segment of the video content based on the modified segment URL.

The method according to embodiments, wherein the plurality of SBD descriptors of the session comprises SBD descriptors in a same media presentation description (MPD) element with the PreSBD descriptor information or the SBD descriptors in a lower-level MPD element than the MPD element with the PreSBD descriptor information.

The method according to embodiments, wherein the PreSBD descriptor information comprises a @urlclass attribute with a value "sbd".

The method according to embodiments, wherein the PreSBD descriptor information includes a type of hypertext transfer protocol (HTTP) get request that is subject to customized SBD document URL generation.

The method according to embodiments, wherein no more than one PreSBD descriptor information is present in a media presentation description (MPD) element.

The method according to embodiments, wherein the PreSBD descriptor information is absent in a lower-level element of a media presentation description (MPD) element with the PreSBD descriptor information.

The method according to embodiments, wherein the PreSBD client is instantiated prior to launching the first SBD client or launching any non-PreSBD client.

The method according to embodiments, wherein respective SBD document URL associated with the plurality of SBD descriptors of the session are transmitted to the PreSBD client prior to processing a respective request for the segment of the video content.

According to embodiments of the present disclosure, an apparatus for providing video content may include at least one memory configured to store computer program code; and at least one processor configured to access the computer program code and operate as instructed by the computer program code. The computer program code may include obtaining code configured to cause the at least one processor to obtain a pre-session-based description (PreSBD) information of a session instructing a PreSBD client to generate customized session-based description (SBD) document uniform resource locator (URL) for a plurality of SBD descriptors of the session; instantiating code configured to cause the at least one processor to instantiate the PreSBD client and passing PreSBD descriptor information; first controlling code configured to cause the at least one processor to control generation of a customized SBD document URL associated with a first SBD descriptor from the plurality of SBD descriptors of the session; and launching code configured to cause the at least one processor to launch a first SBD client based on the customized SBD document URL and passing the first SBD descriptor.

According to embodiments of the present disclosure, a non-transitory computer-readable medium for providing video content storing instructions that, when executed by at least one processor, may cause the at least one processor to obtain a pre-session-based description (PreSBD) information of a session instructing a PreSBD client to generate customized session-based description (SBD) document uniform resource locator (URL) for a plurality of SBD descriptors of the session; instantiate the PreSBD client and passing PreSBD descriptor information; control generation of a customized SBD document URL associated with a first SBD descriptor from the plurality of SBD descriptors of the session; and launch a first SBD client based on the customized SBD document URL and passing the first SBD descriptor.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
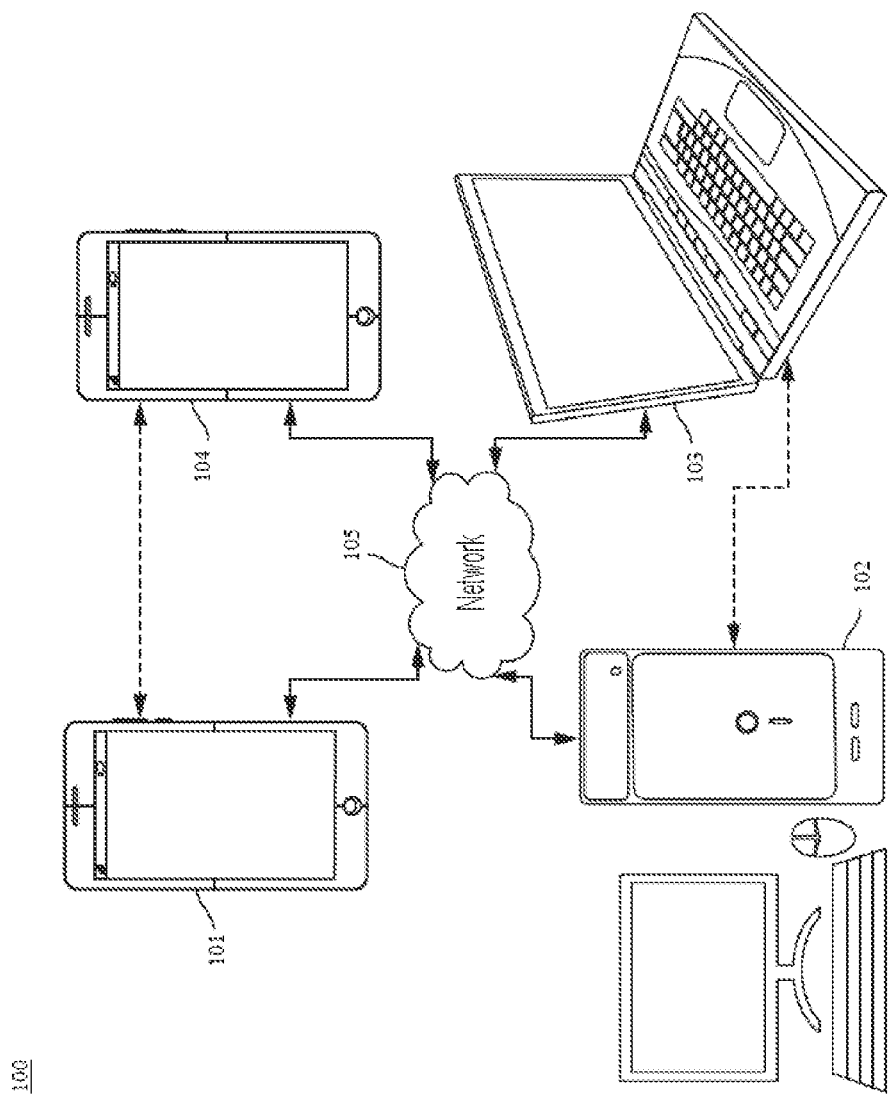
FIG. 1 is a simplified schematic illustration of a communication system, according to embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
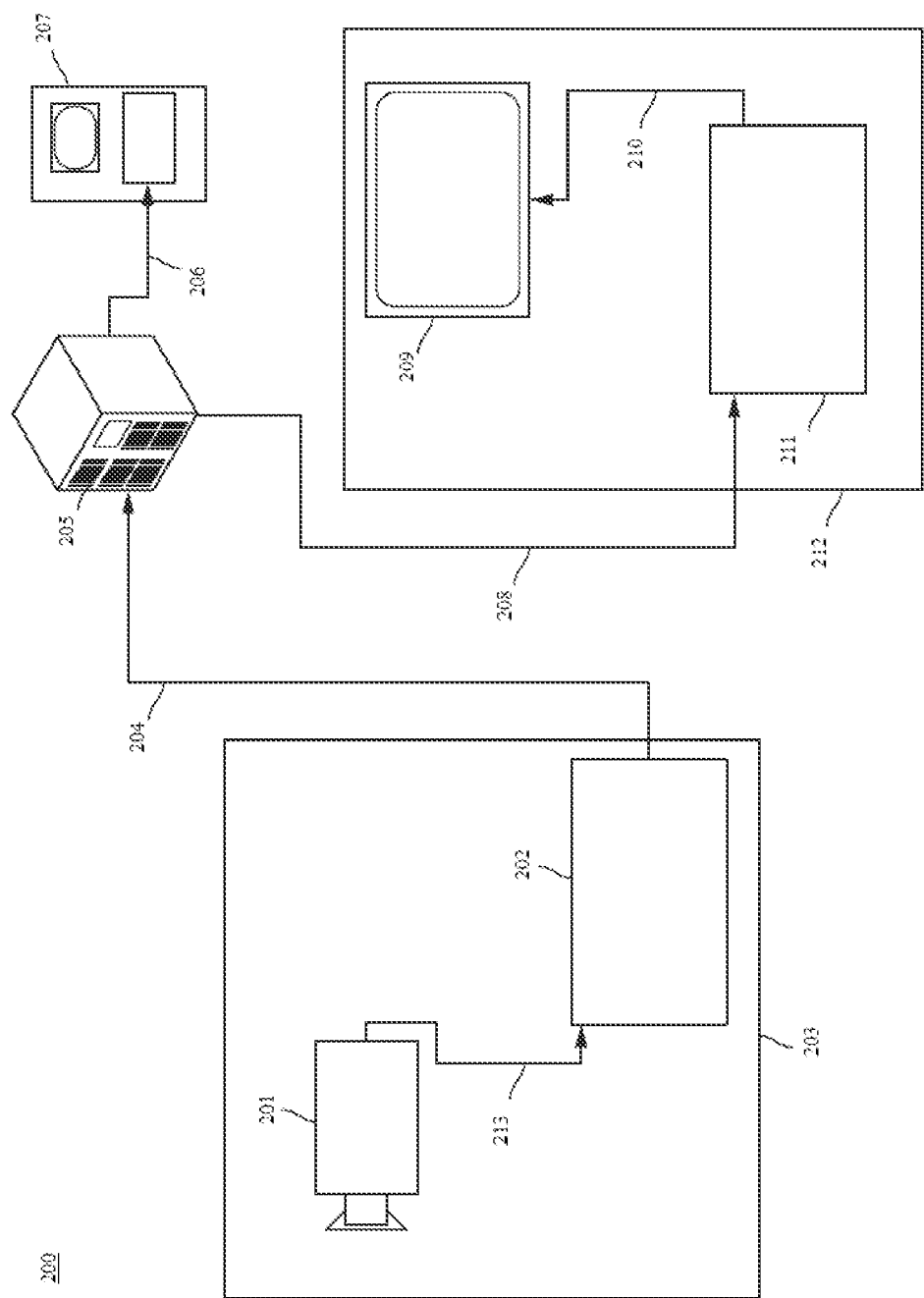
FIG. 2 is a simplified schematic illustration of components in a streaming environment, according to embodiments.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

A streaming system may include a capture subsystem 203, that may include a video source 201, for example a digital camera, creating, for example, an uncompressed video sample stream 213. That sample stream 213 may be emphasized as a high data volume when compared to encoded video bitstreams and may be processed by an encoder 202 coupled to the camera 201. The encoder 202 may include hardware, software, or a combination thereof to enable or implement aspects of the disclosed subject matter as described in more detail below. The encoded video bitstream 204, which may be emphasized as a lower data volume when compared to the sample stream, may be stored on a streaming server 205 for future use. One or more streaming clients 212 and 207 may access the streaming server 205 to retrieve copies 208 and 206 of the encoded video bitstream 204. A client 212 may include a video decoder 211 which decodes the incoming copy of the encoded video bitstream 208 and creates an outgoing video sample stream 210 that may be rendered on a display 209 or other rendering device (not depicted). In some streaming systems, the video bitstreams 204, 206 and 208 may be encoded according to certain video coding/compression standards. Examples of those standards are noted above and described further herein.

Figure 3:
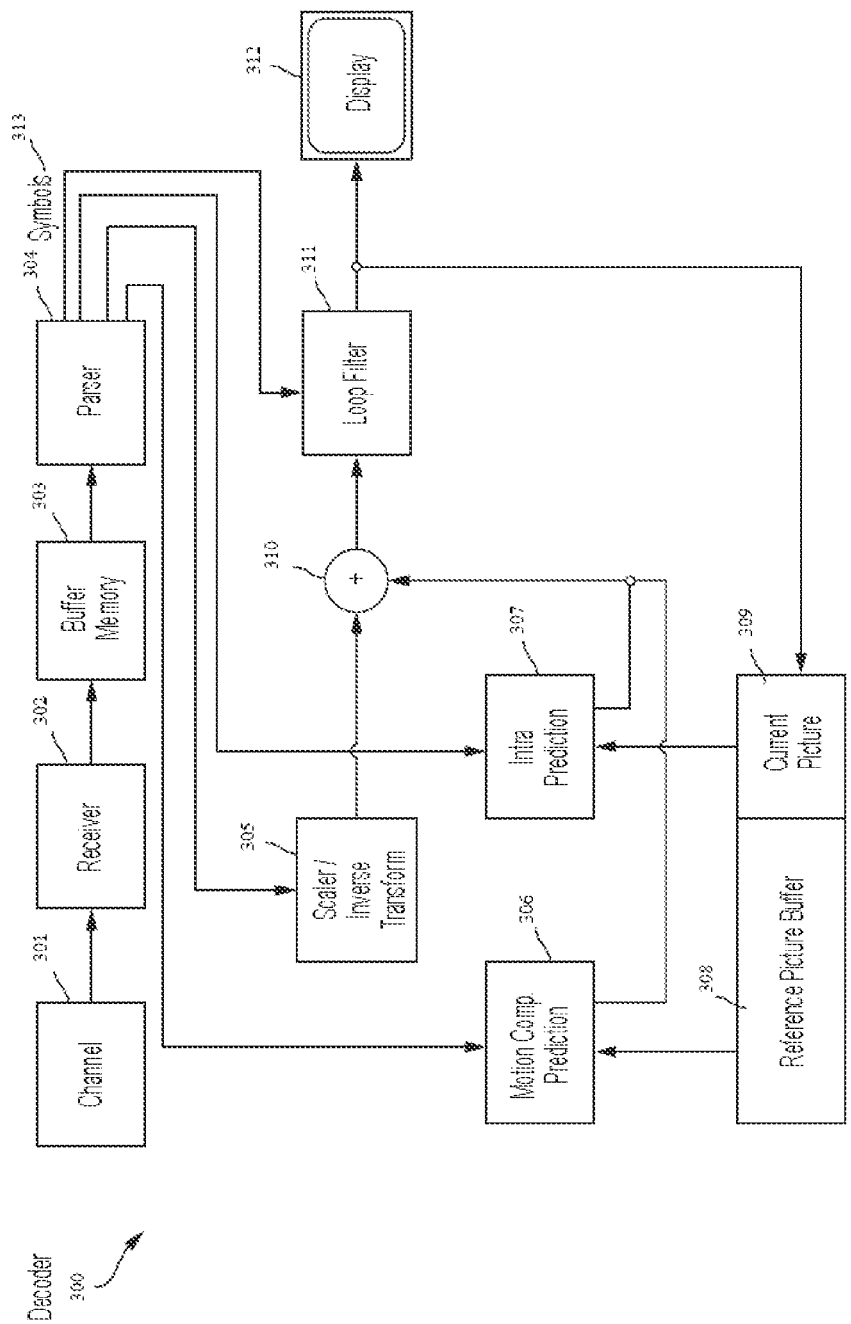
FIG. 3 is a simplified block diagram of an exemplary decoder, according to embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or may be small. For use on best effort packet networks such as the Internet, the buffer 303 may be required, may be comparatively large and may advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but may be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence may be in accordance with a video coding technology or standard, and may follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups may include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 may involve multiple different units depending on the type of the coded video picture or parts thereof (such as: inter and intra picture, inter and intra block), and other factors. Which units are involved, and how, may be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 may be conceptually subdivided into a number of functional units as described below. In a practical implementation operating under commercial constraints, many of these units interact closely with each other and may, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, and quantization scaling matrices, etc. as symbol 313 from the parser 304. It may output blocks comprising sample values that may be input to aggregator 310.

In some cases, the output samples of the scaler/inverse transform 305 may pertain to an intra coded block; that is: a block that is not using predictive information from previously reconstructed pictures, but may use predictive information from previously reconstructed parts of the current picture. Such predictive information may be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 may pertain to an inter coded, and potentially motion compensated block. In such a case, a Motion Compensation Prediction unit 306 may access reference picture memory 308 to fetch samples used for prediction. After motion compensating the fetched samples in accordance with the symbols 313 pertaining to the block, these samples may be added by the aggregator 310 to the output of the scaler/inverse transform unit (in this case called the residual samples or residual signal) so to generate output sample information. The addresses within the reference picture memory form where the motion compensation unit fetches prediction samples may be controlled by motion vectors, available to the motion compensation unit in the form of symbols 313 that may have, for example X, Y, and reference picture components. Motion compensation also may include interpolation of sample values as fetched from the reference picture memory when sub-sample exact motion vectors are in use, motion vector prediction mechanisms, and so forth.

The output samples of the aggregator 310 may be subject to various loop filtering techniques in the loop filter unit 311. Video compression technologies may include in-loop filter technologies that are controlled by parameters included in the coded video bitstream and made available to the loop filter unit 311 as symbols 313 from the parser 304, but may also be responsive to meta-information obtained during the decoding of previous (in decoding order) parts of the coded picture or coded video sequence, as well as responsive to previously reconstructed and loop-filtered sample values.

The output of the loop filter unit 311 may be a sample stream that may be output to the render device 312 as well as stored in the reference picture memory 557 for use in future inter-picture prediction.

Certain coded pictures, once fully reconstructed, may be used as reference pictures for future prediction. Once a coded picture is fully reconstructed and the coded picture has been identified as a reference picture (by, for example, parser 304), the current reference picture 309 may become part of the reference picture buffer 308, and a fresh current picture memory may be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance may be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels may, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data may be in the form of, for example, temporal, spatial, or signal-to-noise ratio (SNR) enhancement layers, redundant slices, redundant pictures, forward error correction codes, and so on.

Figure 4:
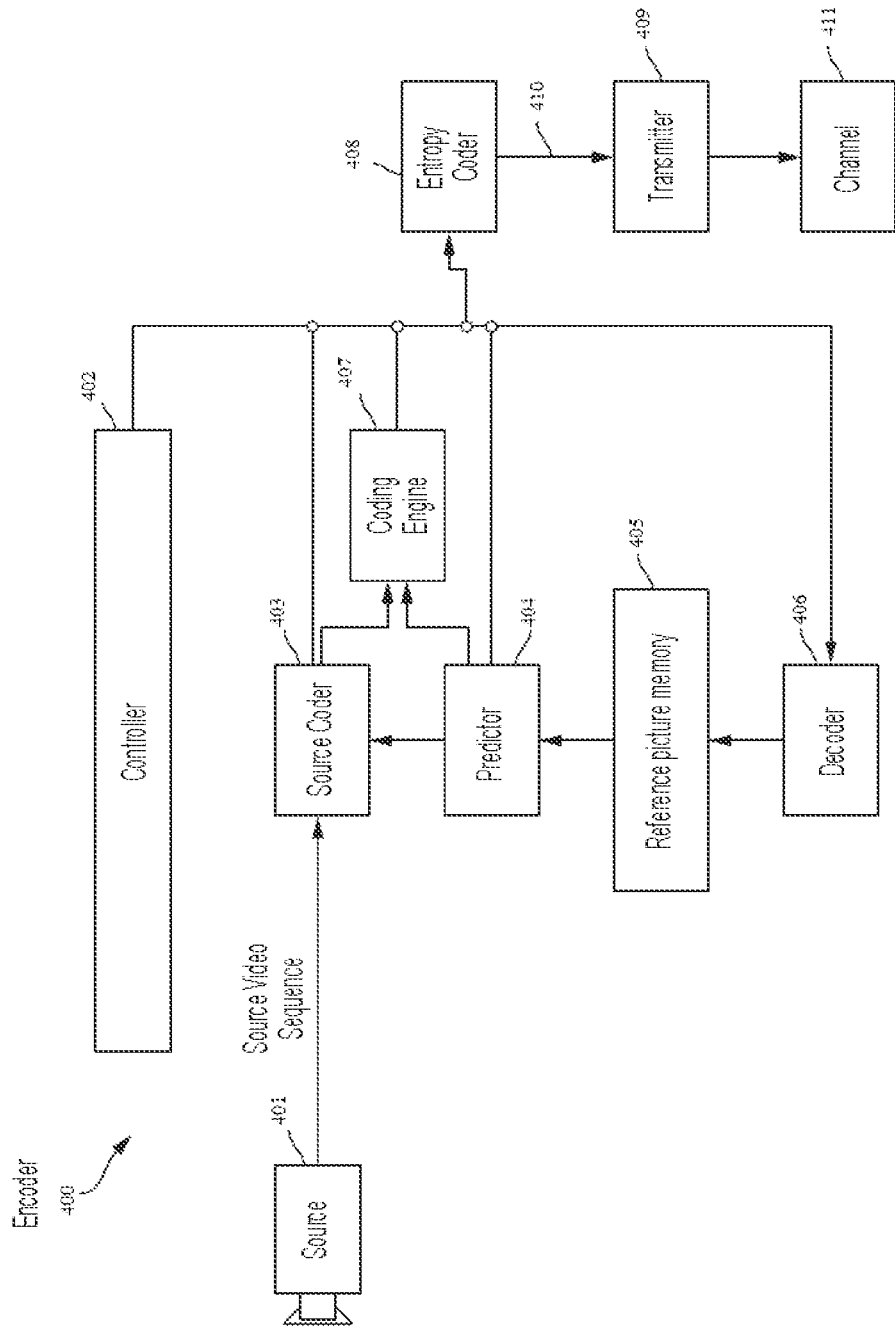
FIG. 4 is a simplified block diagram of an exemplary encoder, according to embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that may be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel may include one or more samples depending on the sampling structure, color space, etc. in use. A person skilled in the art may readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller may include rate control related parameters (picture skip, quantizer, lambda value of rate-distortion optimization techniques . . . ), picture size, group of pictures (GOP) layout, maximum motion vector search range, and so forth. A person skilled in the art may readily identify other functions of controller 402 as they may pertain to video encoder 400 optimized for a certain system design.

Some video encoders operate in what a person skilled in the art readily recognizes as a "coding loop." As an oversimplified description, a coding loop may consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 may be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 may be lossless, the entropy decoding parts of decoder 300, including channel 301, receiver 302, buffer 303, and parser 304 may not be fully implemented in local decoder 406.

An observation that may be made at this point is that any decoder technology except the parsing/entropy decoding that is present in a decoder also necessarily needs to be present, in substantially identical functional form, in a corresponding encoder. The description of encoder technologies may be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures may use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
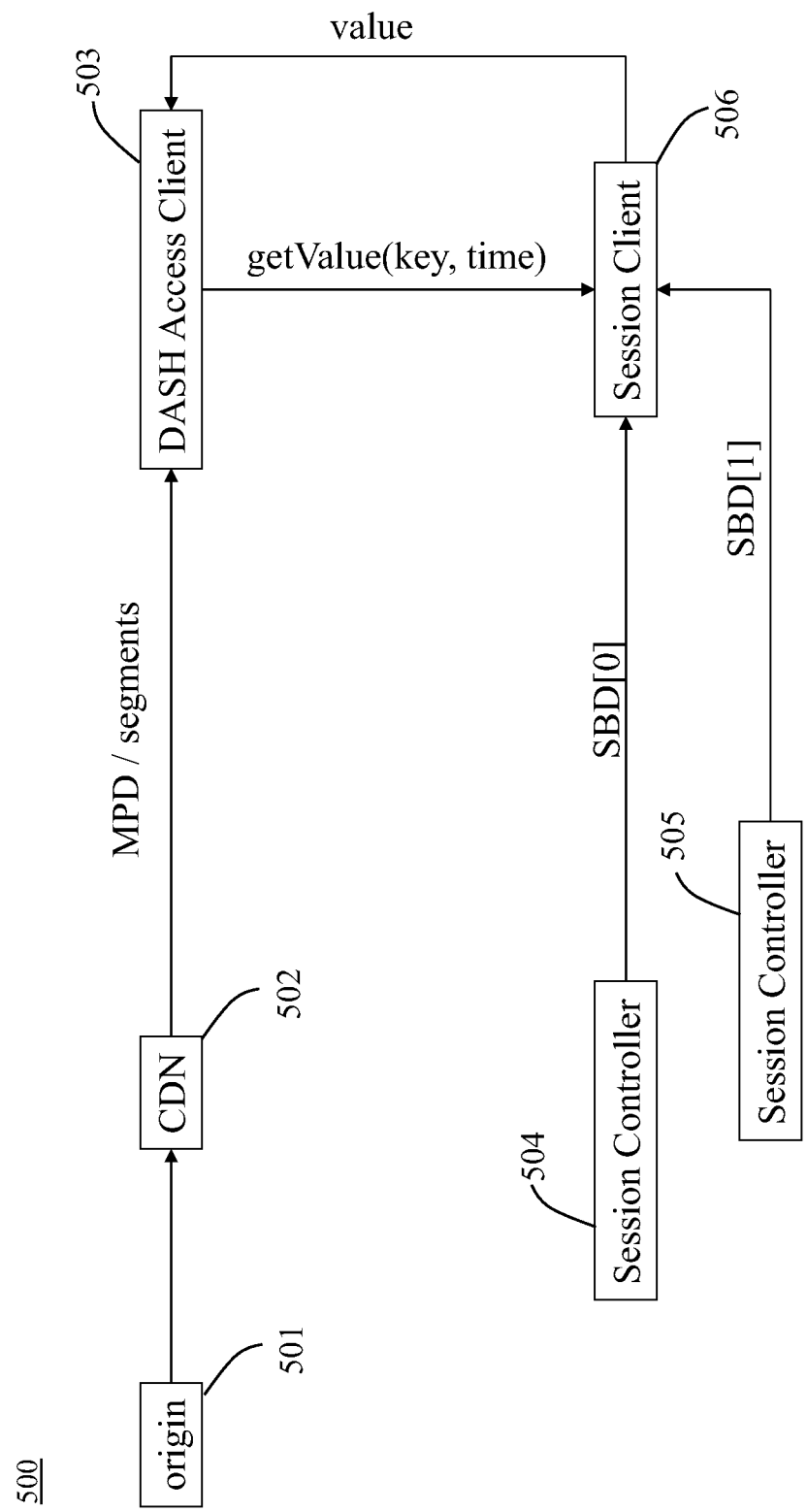
FIG. 5 is a simplified block diagram of an exemplary architecture for session-based DASH operations, according to embodiments.

FIG. 5 illustrates a simplified block diagram of an exemplary architecture 500 for session-based DASH operations, according to embodiments.

Streaming media or video content may originate at origin 501 and be provided to a content delivery network (CDN) 502 which may provide MPD/segments to a DASH access client 503. A session client 506 may be controlled to request a value, by the DASH access client 503 value may be provided to the DASH Access Client 503 from the session client 506. As an example, a value such as by getValue (key, time) may be requested by the DASH access client 503 value may be provided to the DASH Access Client 503 from the session client 506. The session client 506 may provide the value to the DASH access client 503 in conjunction with control from the session controllers 504 and 505 and their respective SBD data, such as SBD[0] n SBD [1] as in the example embodiments of FIGS. 6 and 7.

As an example, there is introduced an element in the SBD descriptor for URL templating, and, more specifically according to embodiments, SBD operations (e.g., query or URL customization) should be such that a session client 506 may apply its processing to the segment URL generated by the DASH access client 503, after retrieving enough information from the MPD in the DASH access client 503. However, the SBD operations shall not intercept the DASH access client 503 operation in example embodiments, and, while example implementations may combine MPD and SBD processing, other embodiments hold that such features may be done consequently. In this light, an advantage thereof may be that the SBD operation may be added to any DASH access client as an application rather than integrated with the DASH client logic. As such, embodiments may change a URL to a new value may be added.

According to embodiments of the present disclosure, the session-based DASH operation standards related to SBD (e.g., ISO/IEC 23009-8) may be extended to allow customization of SBD document URLs or SBD URLs. That is, SBD standard that allows for multiple documents to be applied to URLs or queries of various requests, may be extended to request and apply other SBD URL requests.

An MPD element may have one or more SBD descriptors. However, as stated above, while URLS and requests may be modified using SBD descriptors, SBD document URLs for SBD descriptors may not be modified using available standards. Thus, to solve this technical problem and provide more flexibility in customization, embodiments of the present disclosure add a SBD descriptor called pre-session-description (PreSBD), and PreSBD may be used for customizing other SBD URL requests.

According to embodiments of the present disclosure, a PreSBD descriptor may have the same syntax as that of "regular" SBD descriptors, with a value of "sbd" assigned to its @urlclass attribute. The @urlclass attribute may specify which HPPT GET requests may be subjected to SBD processing. Since @urlclass attribute specifies which HPPT GET requests may be subjected to SBD processing, a value of "sbd" may indicate that the PreSBD descriptor information may include a type of hypertext transfer protocol (HTTP) get request that is subject to customized SBD document URL generation.

The value associated with the @urlclass may be a list of concatenated list of allowable keys. For a PreSBD descriptor, the @urlclass attribute value may be a concatenated list including at least "sbd". Other possible values that may be included in the concatenated list are "segment," "xlink," "mpd," "callback," "chaining," and "fallback."

Attributes of a PreSBD descriptor may not be limited to the @urlclass attribute. Table 1, illustrates an example of MPD EssentialProperty Descriptor attributes for session-based DASH processing using a PreSBD descriptor.

TABLE 1

MPD EssentialProperty Descriptor Attributes for PreSBD

| Element or Attribute Name | Use | Description |
| --- | --- | --- |
| EssentialProperty | | instantiation of EssentialProperty (defined in ISO/IEC 23009-1) for session-based DASH operations |
| @schemeIdUri | M (string) | shall be set to "urn:mpeg:dash:sbd:2020". |
| @value | M (string) | URL of the SBD document for this session |
| @urlClass | OD (default: "segment") | specifies which HTTP GET requests shall be the subject to SBD processing. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "chaining" (requests for chained-to MPDs),<br>6) "fallback" (requests for the alternative MPDs),<br>7) "sbd" (request of the SBD document by all other regular SBD descriptors in the same level of this element or the lower levels except this descriptor).<br>Each key defines an URL class. Each URL class defines a collocation of URLs that its members are used to request a different class of resources, such as the class of segments, the class of Xlink resolutions, and etc.<br>Default value is "segment", i.e. only segment URLs are subject to SBD processing. |
| @template | O | template for applying to the key-value pair found in SBD document. For each Key@name in the template, when the value of a Key@name is found in the SBD document, its corresponding key-value pair of SBD document shall replace the string '$'Key@name'$', where '$' is unescaped '$', in the @template. The result, after applying the replacements for all '$'Key@name'$' in the @template, is added to the end of given URL The @template value shall have no whitespace characters.<br>If absent, for each Key@name, the Key@name and its corresponding value in the SBD document separated by '=' shall be added to the end of the given URL query, where each consecutive key-value pairs are separated by '&'. The order of key-value pairs is defined by the order of Key elements in this descriptor. |
| @hostTemplate | O | host template for applying to the value found in SBD document. For each Host@name in the template, when the value of a Host@name is found in the SBD document, its corresponding value of SBD document shall replace the string '$'Host@name'$', where '$' is unescaped '$', in the @hostTemplate. The result, after applying the replacements for all '$'Host@name'$', in the @hostTemplate, shall replace the given URL's host (as defined in RFC 3986).<br>The @hostTemplate value shall have no whitespace characters. |
| @portTemplate | O | port template for applying to the value found in SBD document. For each Port@name in the template, when the value of a Port@name is found in the SBD document, its corresponding value of SBD document shall replace the string '$'Port@name'$', where '$' is unescaped '$', in the @portTemplate. The result, after applying the replacements for all '$'Port@name'$' in the @portTemplate, shall replace the given URL's port (as defined in RFC 3986). The @portTemplate value shall have no whitespace characters.<br>If absent, for each port@name that occurs at least once in the given URL's port, as well as found in the SBD document, the corresponding value in the SBD document shall replace the first occurrence of the @name the given URL's port. |

TABLE 1-continued

MPD EssentialProperty Descriptor Attributes for PreSBD

| Element or Attribute Name | Use | Description |
|---|---|---|
| @pathTemplate | O | path template for applying to the value found in SBD document. For each Path@name in the template, when the value of a Path@name is found in the SBD document, its corresponding value of SBD document shall replace the string '$'Path@name'$', where '$' is unescaped '$', in the @pathTemplate. The result, after applying the replacements for all '$'Path@name'$' in the @pathTemplate, shall replace the given URL's path (as defined in RFC 3986). The @pathTemplate value shall have no whitespace characters. If absent, for each path@name that occurs at least once in the given URL's path, as well as found in the SBD document, the corresponding value in the SBD document shall replace the first occurrence of the @name of the given URL's path. |
| @urlMatch | OD Default: 'false' | If 'true' and any of the URL host, path or port is not replaced, then other parts are also not replaced, and the given URL shall remain unchanged. |
| @hostMatch | OD Default: 'false' | If 'true' and any key of @hostTemplate not found in the SBD document, then the given URL host shall remain unchanged. |
| @portMatch | OD Default: 'false' | If 'true' and any key of @portTemplate not found in the SBD document, then the given URL port shall remain unchanged. |
| @pathMatch | OD Default: 'false' | If 'true' and any key of @pathTemplate not found in the SBD document, then the given URL path shall remain unchanged. |
| Key | 1 ... N | a key name to be found in SBD document and its default value. If absent, all keys and corresponding values in the corresponding keyList of the SBD document shall be added to the (sub)segment request URL query. |
| @name | M | Name of the key of the SBD document to be added to the queries for this session after processing described by @template. This value shall be a string without whitespaces, start with a letter, and contain only unreserved characters per RFC 3986. If @name value does not appear in the keyList of SBD document, the @name value-@defaultValue value pair shall be used in the template or in the absence of the template. |
| @defaultValue | OD ('null') | default value in key-value pair if @name value not found in SBD document or if there is no value defined for a requested time range or segment number in the SBD document. |
| Host | 0 ... N | a set of URL host keys to be found in SBD document and its default value. |
| @name | O | URI host key for SBD processing. This value shall be a string without whitespaces, start with a letter, and contain only unreserved characters per RFC 3986. |
| @default | O | The default host if the host key is not found in SBD |
| Port | 0 ... N | a set of URL port keys to be found in SBD document and its default value. |
| @name | O | URI port key SBD processing. This value shall be a string without whitespaces, start with a letter, and contain only unreserved characters per RFC 3986. |
| @default | O | The default port if the port key is not found in SBD |
| Path | 0 ... N | a set of URL path keys to be found in SBD document and its default value. |
| @name | O | URI path key SBD processing. This value shall be a string without whitespaces, start with a letter, and contain only unreserved characters per RFC 3986. |
| @default | O | The default path if the path key is not found in SBD |

According to embodiments of the present disclosure, including PreSBD Descriptor in MPD processing may have one or more restrictions.

While an MPD may have one or more PreSBD descriptors, according to some embodiments, a MPD element may only have at most one PreSBD descriptor. In some embodiments, the MPD may have more than one PreSBD, no more than one PreSBD descriptor information may be present in one media presentation description (MPD) element. In an embodiment, lower-level elements of an MPD element having a PreSBD may not have a PreSBD Descriptor. Accordingly, the PreSBD descriptor information may be absent in a lower-level element of a media presentation description (MPD) element with the PreSBD descriptor information. Therefore, according to some embodiments, a MPD element may have at most one PreSBD descriptor.

According to embodiments of the present disclosure, for a MPD element, the PreSBD descriptor may be processed prior to any of the "regular" SBD descriptors in that MPD element being processed. This disclosure is directed to customizing SBD document URLs using other SBD URLs. To enable such a hierarchical structure and enable "regular" SBD descriptors to customize their SBD document URLs, the PreSBD descriptor may be processed before any other descriptors in a MPD element. Therefore, a PreSBD client may be instantiated before instantiation of any other SBD clients of the MPD element.

According to embodiments of the present disclosure, the SBD document URL of any SBD descriptor may be sent to the corresponding PreSBD client for customization before a request for the SBD document is made. In some embodiments, the SBD document URL of any SBD descriptor may be sent to the corresponding PreSBD client for customization prior to a request for a SBD document is made and a respective SBD client generates and/or modifies a segment URL for the segment of the video content. Therefore, a respective SBD document URL associated with the plurality of SBD descriptors in the same MPD element for the session may be transmitted to the PreSBD client prior to processing a respective request for the segment of the video content.

Figure 6:
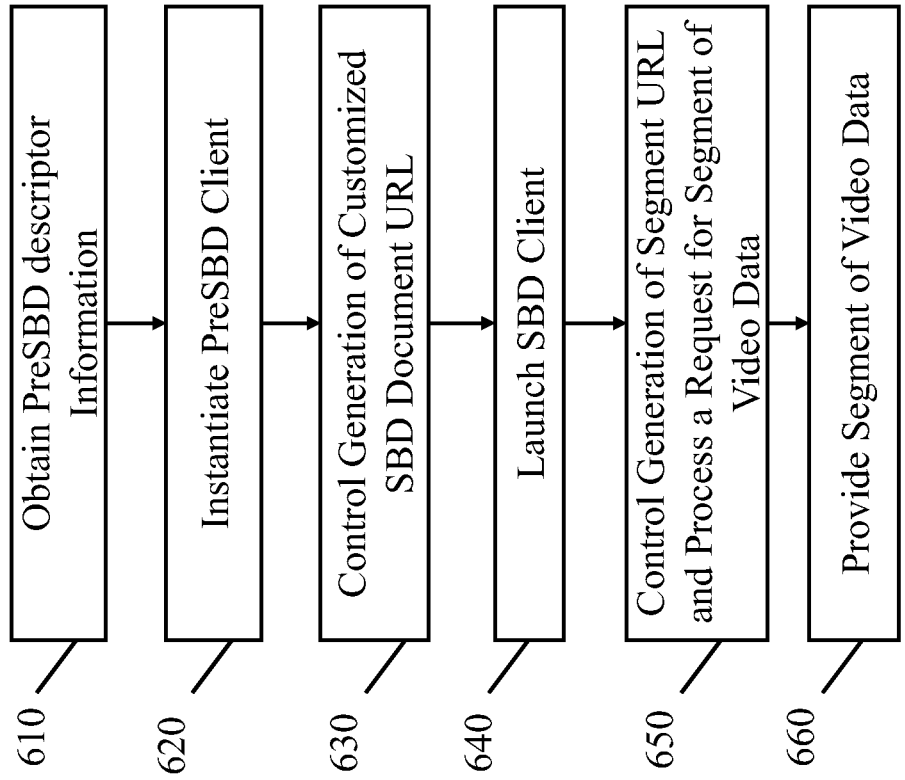
FIG. 6 is a simplified flow chart illustrating a process for session-based description URL customization, according to embodiments.
Figure 7:
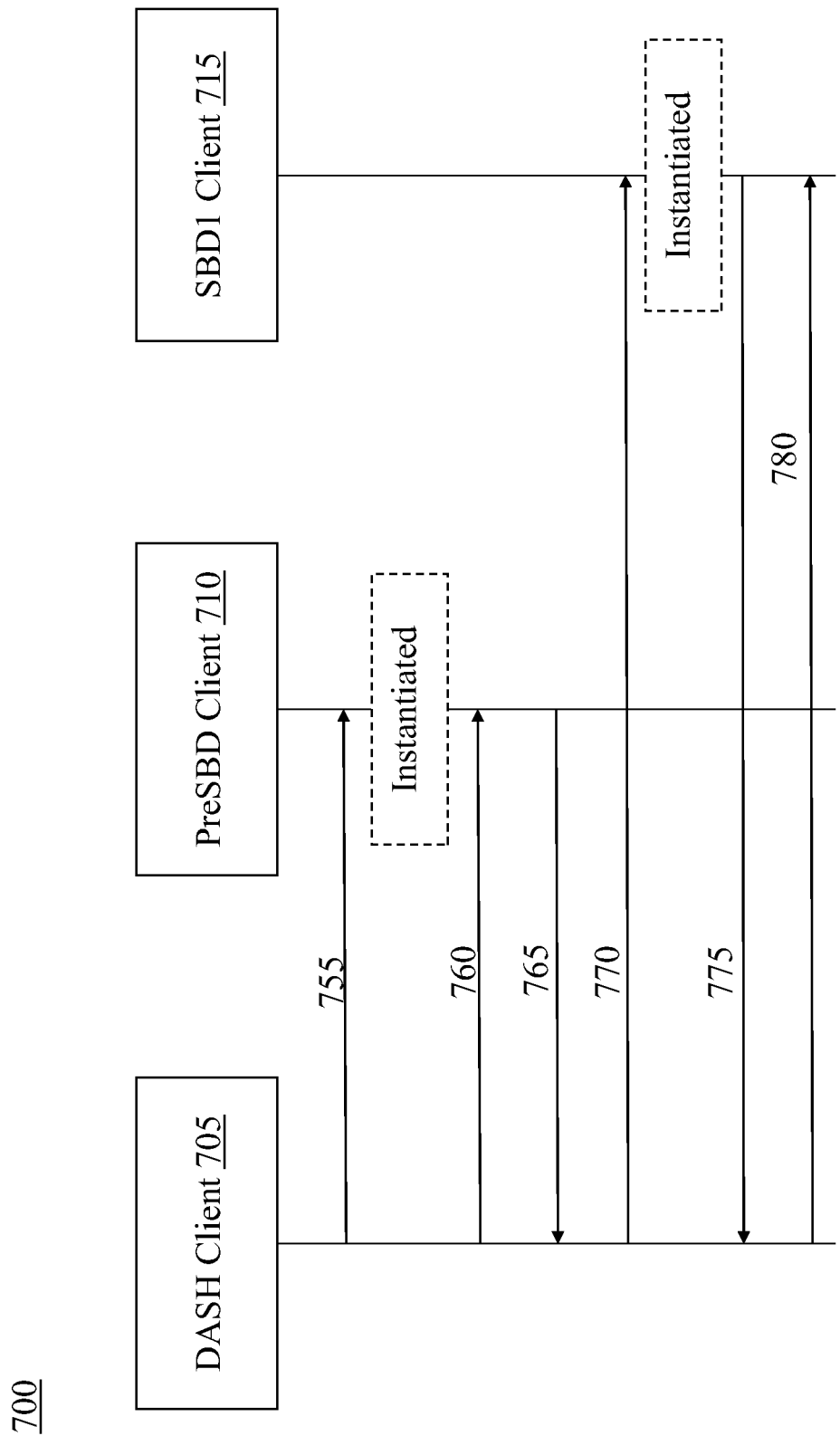
FIG. 7 is a simplified illustration of call flows for session-based description URL customization, according to embodiments.

Referring now to FIGS. 6 and 7, FIG. 6 is a flow chart illustrating a process 600 for session-based description URL customization; and FIG. 7 is an exemplary illustration of call flow 700 for session-based description URL customization, according to embodiments.

As shown in FIG. 6, at operation 610, a pre-session-based description (PreSBD) information of a session may be obtained instructing a PreSBD client to generate customized session-based description (SBD) document uniform resource locator (URL) for a plurality of SBD descriptors of the session. As an example, a DASH client, such as DASH access client 503, may parse the MPD such as from the CDN 502, and obtain a pre-session-based description (PreSBD) information of a session instructing a PreSBD client to generate customized session-based description (SBD) document uniform resource locator (URL) for a plurality of SBD descriptors of the session.

At operation 620, the PreSBD client may be instantiated and PreSBD descriptor information may be passed to the PreSBD client. As an example, the DASH client, such as DASH client 705 may perform finding of the PreSBD descriptor which may instantiate the PreSBD client, such as PreSBD client 710. In some embodiments, the PreSBD descriptor information may include a @urlclass attribute with a value "sbd," which may be used by the DASH client 705. In some embodiments, the PreSBD descriptor information may include a type of hypertext transfer protocol (HTTP) GET request that may be subject to customized SBD document URL generation, and such information may by the DASH client 705.

According to embodiments, the PreSBD client may be instantiated prior to launching the first SBD client or launching any non-PreSBD client in the MPD element. As an example, referring to FIG. 7, at operation 755 of the call flow 700, the DASH client 705 may perform finding of the PreSBD descriptor which may instantiate the PreSBD client, such as PreSBD client 710, and pass on the PreSBD descriptor to the PreSBD client 710.

At operation 630, of process 600, generation of a customized SBD document URL associated with a first SBD descriptor from the plurality of SBD descriptors of the session may be controlled. As an example, at operation 760 of the call flow 700, the DASH client 705 may control the generation of a customized SBD document URL associated with a first SBD descriptor, such as, SBD1 descriptor. At operation 765, the DASH client 705 may receive the customized SBD document URL associated with the first SBD descriptor SBD1. In some embodiments, the PreSBD client 710 may generate the customized SBD document under the direction of DASH client 705.

According to embodiments, the plurality of SBD descriptors of the session for whom the customized SBD document URL may be generated may include SBD descriptors in a same media presentation description (MPD) element with the PreSBD descriptor information or the SBD descriptors in a lower-level MPD element than the MPD element with the PreSBD descriptor information. As stated above, the PreSBD process may have some restrictions including no more than one PreSBD descriptor information may be present in a media presentation description (MPD) element and the PreSBD descriptor information may be absent in a lower-level element of a media presentation description (MPD) element with the PreSBD descriptor information.

Since the PreSBD descriptor is needed to instantiate the PreSBD client and generate the customized SBD document URL associated with a SBD descriptor from the plurality of SBD descriptors of the session, according to embodiments, the PreSBD client may be instantiated prior to launching the first SBD client or launching any non-PreSBD client. Similarly, according to embodiments, respective SBD document URL associated with the plurality of SBD descriptors of the session are transmitted to the PreSBD client prior to processing a respective request for the segment of the video content.

At operation 640, of process 600, first SBD client may be launched based on the customized SBD document URL and the first SBD descriptor may be passed to the first SBD client. As an example, at operation 770, of call flow 700, the DASH client 705 may launch SBD1 client 715 based on the customized SBD document URL associated with the first SBD descriptor SBD1 received at operation 765.

At operation 650, of process 600, generation of a segment uniform resource locator (URL) may be controlled based on the first SBD descriptor and the customized SBD document URL, and a request for a segment of the video content by at least modifying the segment URL may be processed. As an example, at operations 770 and 775, the DASH client 705 may control the generation of a segment uniform resource locator (URL) based on the PreSBD descriptor and SBD1 descriptor. In some embodiments, the SBD1 client 715 may generate a segment uniform resource locator (URL) under the direction of DASH client 705.

Further, at operation 650, a request for a segment of the video content by at least modifying the segment URL may be processed. According to embodiments, respective SBD document URLs associated with the plurality of SBD descriptors of the session may be transmitted to the PreSBD client prior to processing a respective request for the segment of the video content.

At operation 660, the segment of the video content based on the modified segment URL may be provided. As an example, the DASH client 705, at operation 780 of call flow 700 may provide the segment of the video content based on the modified segment URL received from SBD1 Client 715. In some embodiments, the DASH client 705, at operation 780 of call flow 700 may process a request for a segment of the video content by at least modifying the segment URL received from SBD1 Client 715, and provide the segment of the video content based on the modified segment URL.

The techniques described above, may be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software may be coded using any suitable machine code or computer language, that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 8:
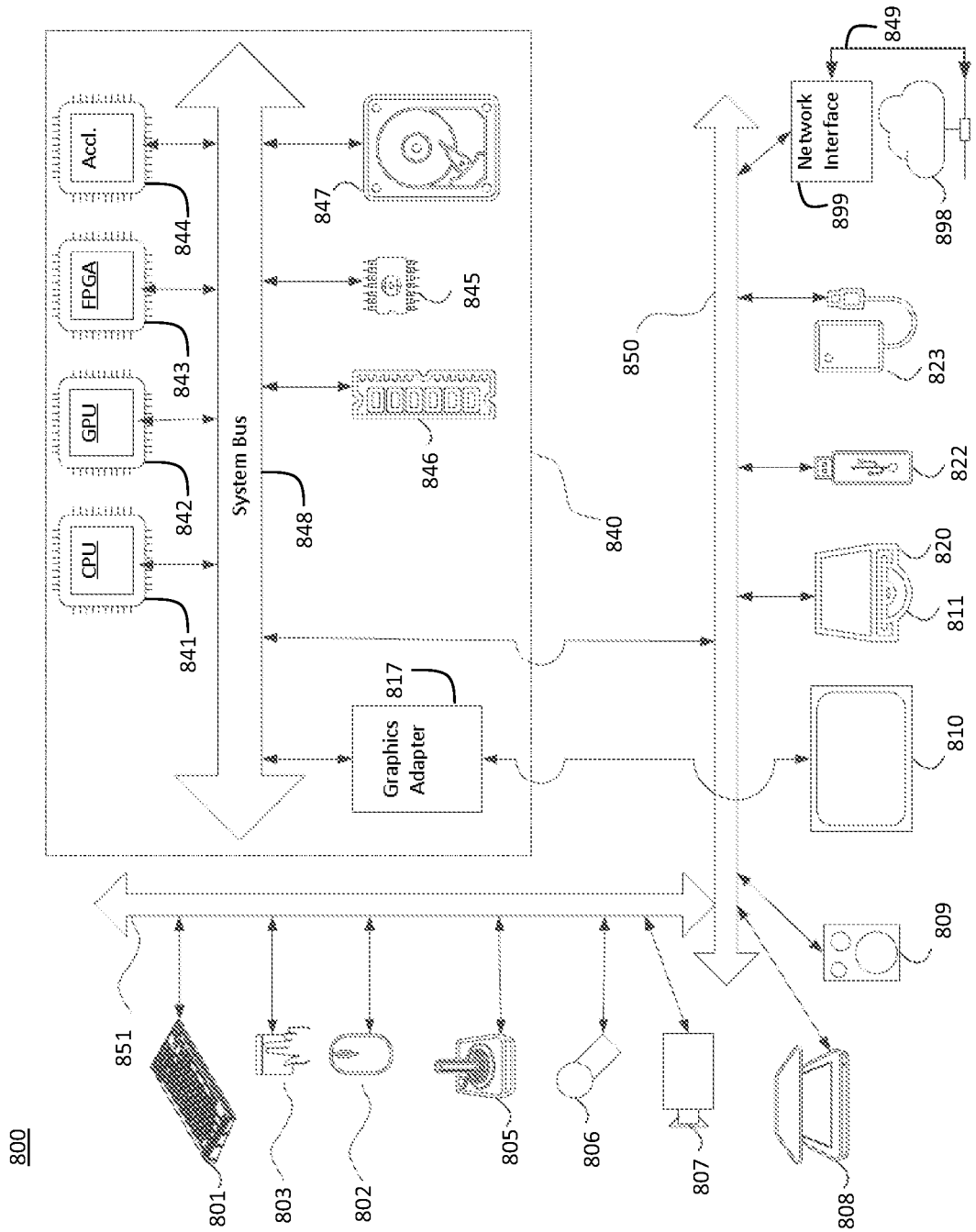
FIG. 8 is a schematic illustration in accordance of a computer system, according to embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there may also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 800 may also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 may also include interface 899 to one or more communication networks 898. Networks 898 may for example be wireless, wireline, optical. Networks 898 may further be local, wide-area, metropolitan, vehicular and industrial, real-time, delay-tolerant, and so on. Examples of networks 998 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (850 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 may communicate with other entities. Such communication may be uni-directional, receive only (for example, broadcast TV), uni-directional send-only (for example CANbusto certain CANbus devices), or bi-directional, for example to other computer systems using local or wide area digital networks. Certain protocols and protocol stacks may be used on each of those networks and network interfaces as described above.

Aforementioned human interface devices, human-accessible storage devices, and network interfaces may be attached to a core 840 of the computer system 800.

The core 840 may include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 may be accessible in the form of one or more physical plugs to enable extensions by additional CPUs, GPU, and the like. The peripheral devices may be attached either directly to the core's system bus 848, or through a peripheral bus 851. Architectures for a peripheral bus include PCI, USB, and the like.

CPUs 841, GPUs 842, FPGAs 843, and accelerators 844 may execute certain instructions that, in combination, may make up the aforementioned computer code. That computer code may be stored in ROM 845 or RAM 846. Transitional data may be also be stored in RAM 846, whereas permanent data may be stored for example, in the internal mass storage 847. Fast storage and retrieval to any of the memory devices may be enabled through the use of cache memory, that may be closely associated with one or more CPU 841, GPU 842, mass storage 847, ROM 845, RAM 846, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 800, and specifically the core 840 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 840 that are of non-transitory nature, such as core-internal mass storage 847 or ROM 845. The software implementing various embodiments of the present disclosure may be stored in such devices and executed by core 840. A computer-readable medium may include one or more memory devices or chips, according to particular needs. The software may cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system may provide functionality as a result of logic hardwired or otherwise embodied in a circuit (for example: accelerator 844), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for providing video content in a Dynamic Adaptive Streaming over Hypertext Transfer Protocol (DASH) streaming session, the method performed by at least one processor, and comprising:
    obtaining a pre-session-based description (PreSBD) information of the DASH streaming session instructing a PreSBD client to generate customized session-based description (SBD) document uniform resource locator (URL) for a plurality of SBD descriptors of the DASH streaming session, the PreSBD descriptor being separate from the plurality of SBD descriptors, the PreSBD descriptor having a specific value as its @urlclass attribute which identifies the PreSBD descriptor, and the customized SBD document URL being based one or more SBD descriptors in the same level of the PreSBD descriptor;
    instantiating the PreSBD client prior to instantiating a first SBD descriptor and passing PreSBD descriptor information;
    controlling generation of the customized SBD document URL associated with the first SBD descriptor from the plurality of SBD descriptors of the DASH streaming session; and
    launching a first SBD client based on the customized SBD document URL and passing the first SBD descriptor to the first SBD client.

2. The method of claim 1, further comprising:
    controlling generation of a segment uniform resource locator (URL) based on the first SBD descriptor and the customized SBD document URL, and processing a request for a segment of the video content by at least modifying the segment URL; and
    providing the segment of the video content based on the modified segment URL.

3. The method of claim 1, wherein the plurality of SBD descriptors of the DASH streaming session comprises SBD descriptors in a same media presentation description (MPD) element with the PreSBD descriptor information or the SBD descriptors in a lower-level MPD element than the MPD element with the PreSBD descriptor information.

4. The method of claim 1, wherein the PreSBD descriptor information comprises a @urlclass attribute with a value "sbd".

5. The method of claim 1, wherein the PreSBD descriptor information includes a type of hypertext transfer protocol (HTTP) get request that is subject to customized SBD document URL generation.

6. The method of claim 1, wherein no more than one PreSBD descriptor information is present in a media presentation description (MPD) element.

7. The method of claim 1, wherein the PreSBD descriptor information is absent in a lower-level element of a media presentation description (MPD) element than with the PreSBD descriptor information.

8. The method of claim 1, wherein the PreSBD client is instantiated prior to launching any non-PreSBD client.

9. The method of claim 1, wherein respective SBD document URL associated with the plurality of SBD descriptors of the DASH streaming session are transmitted to the PreSBD client prior to processing a respective request for the segment of the video content.

10. An apparatus comprising:
    at least one memory configured to store computer program code;
    at least one processor configured to access the computer program code and operate as instructed by the computer program code, the computer program code including:
        obtaining code configured to cause the at least one processor to obtain a pre-session-based description (PreSBD) information of a DASH streaming session instructing a PreSBD client to generate customized session-based description (SBD) document uniform resource locator (URL) for a plurality of SBD descriptors of the DASH streaming session, the PreSBD descriptor being separate from the plurality of SBD descriptors, the PreSBD descriptor having a specific value as its @urlclass attribute which identifies the PreSBD descriptor, and the customized SBD document URL being based one or more SBD descriptors in the same level of the PreSBD descriptor;
        instantiating code configured to cause the at least one processor to instantiate the PreSBD client prior to instantiating a first SBD descriptor and passing PreSBD descriptor information;

first controlling code configured to cause the at least one processor to control generation of the customized SBD document URL associated with the first SBD descriptor from the plurality of SBD descriptors of the DASH streaming session; and launching code configured to cause the at least one processor to launch a first SBD client based on the customized SBD document URL and passing the first SBD descriptor.

11. The apparatus of claim 10, further comprising:

second controlling code configured to cause the at least one processor to control generation of a segment uniform resource locator (URL) based on the first SBD descriptor and the customized SBD document URL, and processing a request for a segment of the video content by at least modifying the segment URL; and providing code configured to cause the at least one processor to provide the segment of the video content based on the modified segment URL.

12. The apparatus of claim 10, wherein the plurality of SBD descriptors of the DASH streaming session comprises SBD descriptors in a same media presentation description (MPD) element with the PreSBD descriptor information or the SBD descriptors in a lower-level MPD element than the MPD element with the PreSBD descriptor information.

13. The apparatus of claim 10, wherein the PreSBD descriptor information includes a type of hypertext transfer protocol (HTTP) get request that is subject to customized SBD document URL generation.

14. The apparatus of claim 10, wherein no more than one PreSBD descriptor information is present in a media presentation description (MPD) element.

15. The apparatus of claim 10, wherein the PreSBD descriptor information is absent in a lower-level element of a media presentation description (MPD) element than with the PreSBD descriptor information.

16. The apparatus of claim 10, wherein the PreSBD client is instantiated prior to launching any non-PreSBD client.

17. The apparatus of claim 10, wherein respective SBD document URL associated with the plurality of SBD descriptors of the DASH streaming session are transmitted to the PreSBD client prior to processing a respective request for the segment of the video content.

18. A non-transitory computer-readable medium storing instructions that, when executed by at least one processor, cause the at least one processor to:

obtain a pre-session-based description (PreSBD) information of a DASH streaming session instructing a PreSBD client to generate customized session-based description (SBD) document uniform resource locator (URL) for a plurality of SBD descriptors of the DASH streaming session, and the PreSBD descriptor being separate from the plurality of SBD descriptors, the PreSBD descriptor having a specific value as its @urlclass attribute which identifies the PreSBD descriptor, and the customized SBD document URL being based one or more SBD descriptors in the same level of the PreSBD descriptor;

instantiate the PreSBD client prior to instantiating a first SBD descriptor and passing PreSBD descriptor information;

control generation of the customized SBD document URL associated with the first SBD descriptor from the plurality of SBD descriptors of the DASH streaming session; and launch a first SBD client based on the customized SBD document URL and passing the first SBD descriptor.

19. The non-transitory computer-readable medium of claim 18, further storing instructions that cause the at least one processor to:

control generation of a segment uniform resource locator (URL) based on the first SBD descriptor and the customized SBD document URL, and processing a request for a segment of the video content by at least modifying the segment URL; and providing code configured to cause the at least one processor to provide the segment of the video content based on the modified segment URL.

20. The non-transitory computer readable medium of claim 18, wherein the plurality of SBD descriptors of the DASH streaming session comprises SBD descriptors in a same media presentation description (MPD) element with the PreSBD descriptor information or the SBD descriptors in a lower-level MPD element than the MPD element with the PreSBD descriptor information.

* * * * *